3,700,537
HIGH PRESSURE LAMINATES WITH
DEEPLY EMBOSSED SURFACE
Herbert I. Scher, Randallstown, Md. (% Enjay Fibers
and Laminates Co., Odenton, Md. 21113)
Filed Dec. 1, 1970, Ser. No. 94,096
Int. Cl. B32b 3/30, 31/26
U.S. Cl. 161—89         8 Claims

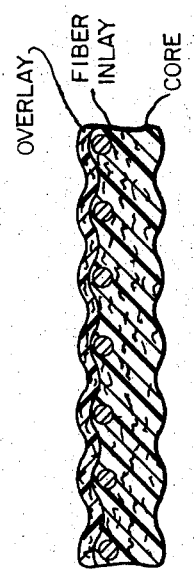
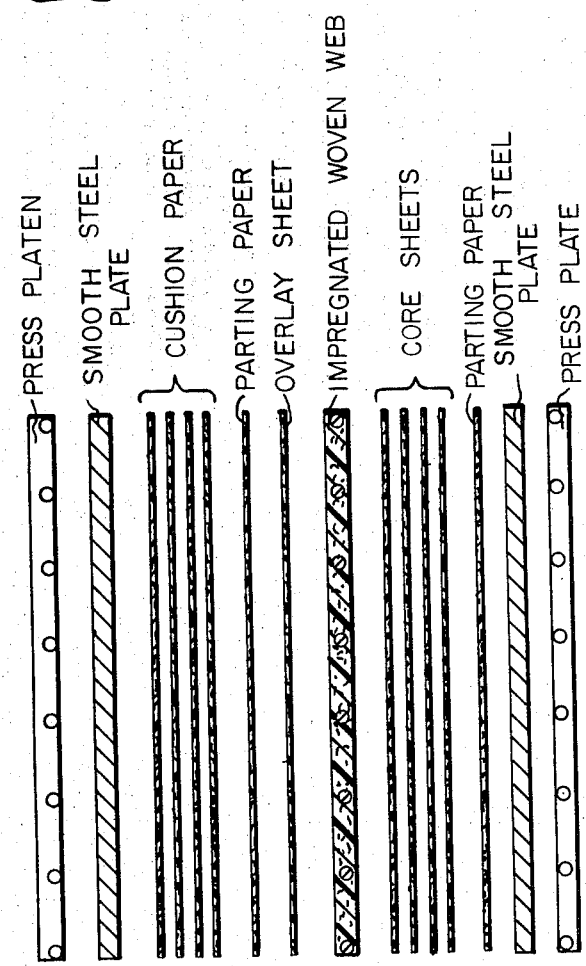
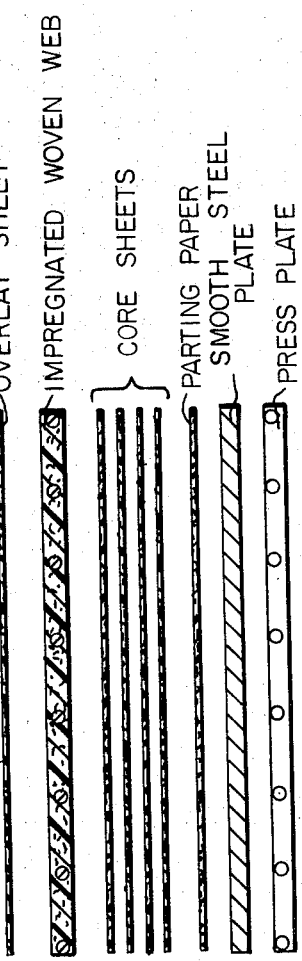
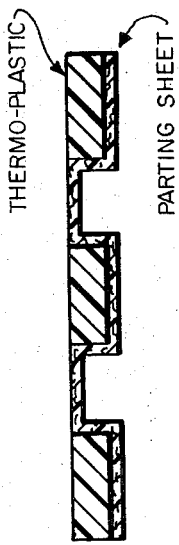
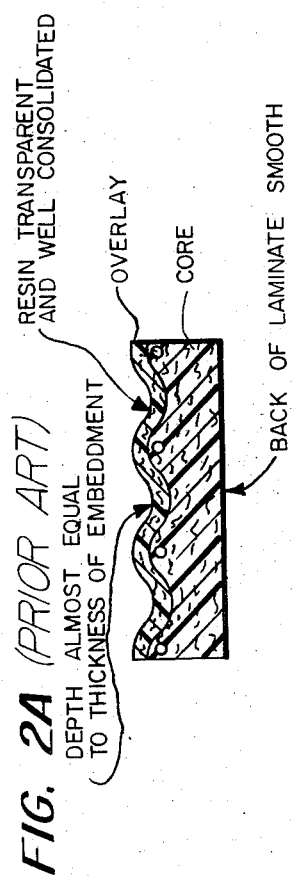

ABSTRACT OF THE DISCLOSURE

A high pressure laminate with deeply embossed surface is produced using as a decorative sheet beneath the overlay, a relatively thick element of varying cross section, such as woven cane, lace, or a paper sheet containing holes of various shapes. During laminating, a thermoplastic layer is included between the parting sheet and the upper caul plate, the thermoplastic layer is reduced to the fluid state during the laminating operation, and the resultant laminate is found to be debossed to a depth that is substantially equal to the thickness variation in the ply of varying cross section. In addition, the depressed portions of the laminate surface are fully consolidated. The process enables economic production of decorative high pressure laminates having deeply embossed surfaces, which are highly desirable to architects and furniture designers.

FIELD OF THE INVENTION

The present invention relates to decorative high pressure laminates and, more particularly, to such a laminate having an embossed and/or debossed surface of thickness variation greater than 7 mils in thickness, and a method of making such a laminate.

BACKGROUND OF THE INVENTION

The production of high pressure laminates is well known and has been carried out for many years. Generally, such laminates are produced by consolidating, under heat and pressure, plies of paper impregnated with thremosetting condensation resins. The plies are typically consolidated and cured at 500–1600 p.s.i., preferably 800–1200 p.s.i., and 230–310° F., preferably 260–310° F., against suitable pressure plate dies, usually steel caul plates, which provide the laminate with a smooth surface. The laminates produced are extremely hard and attractive and provide a permanent surfacing material known as a "high pressure laminate"; these have, for many years, found use as table tops, desk tops, counter tops, wall paneling, etc.

Most general purpose decorative laminates, of about 1/16" thickness are made of the following component plies, from the top down: The top sheet or overlay is normally an alpha-cellulose paper, about 29 lb. ream weight, impregnated with a water solution of melamine-formaldehyde condensate, dried and partially cured in a hot air oven. This sheet turns transparent during final press cure; its function is to protect the print sheet from abrasion or other abuse. Beneath the overlay sheet is the print sheet which is normally an alpha-cellulose paper, pigment filled, with or without decorative printing, ranging in weight from 65–125 lb. ream weight. The print sheet is also impregnated with an amino resin condensate, usually melamine-formaldehyde resin dried and partially advanced as in the case with the overlay sheet. Beneath the print sheet are located a plurality, such as six, core sheets which are normally 100–130 lb. ream weight kraft paper, impregnated with a water or alcohol soluble phenol-formaldehyde condensate, dried and partially cured in a hot air oven. All of the partially cured resin condensates in the assembly are known as cured to the "B-stage" in which they are thermoplastic and will flow under heat and pressure prior to the laminating procedure.

The above described assembly is repeated until a "book" containing, typically, ten assemblies is obtained. The book is inserted in a high pressure press, and the laminates are cured under the conditions of heat and pressure indicated above. During the pressing cycle, the resins flow and cure, consolidating the individual plies and forming a comprehensive and infusable cross-linked product. After cure, the book is removed from the press and the laminates are separated, trimmed, and their backs or bottom surfaces sanded to improve adhesion for subsequent gluing to various substrates.

While in the early years, glossy surface laminates were primarily produced between polished plates, in more recent years it has become increasingly desirable to provide various types of irregular surfaces including shallow depressioned textured surfaces to relatively deeply sculptured three dimensional surfaces which simulate wood grain, leather, slate, etc. and have a surface depth as great in some cases as 7 mils. The shallow matte or textured surface laminates are produced in the same manner as the glossy surface laminates as indicated above, except that a parting sheet is included between the upper laminate surface and smooth steel plate.

FIG. 1 is a typical assembly for pressing of a matte surfaced, general purpose, 1/16" laminate in accordance with conventional practice. In this case the parting sheet is typically a 25 lb. paper with an organic release coating. Similarly, textured surface laminates are produced by including between the impregnated overlay and the steel caul plate a parting sheet conventionally made of plain or clay coated paper bonded to a thin, about 0.3 mil, aluminum foil. During curing of the laminate, the texture of the paper in the separator sheet is imparted to the laminate surface, while the aluminum foil layer establishes the value of gloss imparted to the laminate, and also functions as a release layer, which allows the parting sheet to be stripped from the cured laminate. Textures produced in this fashion are very shallow reproductions of the paper making screen, which are seen in the parting sheet paper as density or cross sectional variations. The depth of the texture can vary depending on the grade of paper used in the parting sheet, but in general the depth is no more than about 1 mil.

Where it is desirable to produce high pressure laminates with deeply embossed surfaces that duplicate natural products such as slate, leather and wood, or non-representational effects that are functionally useful because they tend to hide the effects of physical abuse, several techniques can be used. Thus engraved metal plates can be used in place of the smooth caul plates; when made in sizes of commercial significance, these engraved plates are extremely expensive, and difficult to repair if damaged.

A more satisfactory alternative is the use of metal core plates surfaced with thermosetting resin impregnated paper, in which the surface has been molded against a replica of the desired embossed design in accordance with the Michaelson et al. Pat. 3,311,520. These latter plates are easily and cheaply produced but the depth of the surface embossment is limited to about 7 mils; if attempts are made to produce a deeper configuration, the definition of the embossment is lost after a few pressings. In addition, the irregular distribution of pressure due to peaks greater than about 7 mils causes the plate to become dimpled during pressing unless an unreasonably thick metal core plate is used.

A third alternative is the use of embossed parting sheets: paper can be embossed with a design, and then one surface coated to a smooth, level plane. Since the sheet then has a varying cross sectional thickness, the embossed design will be imparted to the surface of the laminate during its flow period under heat and pressure. However, this process is usually limited to the production of shallow embossed designs.

In the past, some attempts have been made using woven fabrics, usually impregnated with melamine formaldehyde condensate, in place of the impregnated paper print sheets. It has been observed that when a parting sheet is also used above the overlay, a slight cloth impression is imparted to the surface of the cured laminate, corresponding to the thickness variation of the cloth ply. If, in addition to the parting sheet, several sheets of soft kraft paper are included between the parting sheet and the caul plate as shown in FIG. 2A, the cured laminate surfact will have a distinct embossment, in which the depth is some fraction of the thickness variation in the woven fabric as seen in FIG. 2B, which shows the cross-section greatly exaggerated.

However, laminates prepared in this fashion have several undesirable characteristics: First, if the thickness variation in the woven ply is great enough to provide an interesting surface depth variation, the woven ply is crushed, and the shape of its component strands are distorted. Second, and more important, the low or depressed areas of the laminate surface are hazy, indicating poor consolidation due to lack of sufficient pressure as shown in FIG. 2C, particularly when the depth variation begins to approach 7 mils. In order to provide an adequate high pressure laminate, each portion of the laminate must be consolidated at a pressure of at least 500 p.s.i. since the melamine resin used will normally flow out and consolidate properly only at this or greater pressure. Thus, the woven fabric provides enough bridging to prevent full application of the caul pressure, be it 500 or 1600 p.s.i., to the depressed portions of the laminate, and such interposed fabric appears to reduce the pressure to below 500 p.s.i. in the depressed portions.

A third disadvantage of laminates prepared in this fashion is the tendency for a considerable portion of the thickness variation of the woven ply to be transmitted to the back of each laminate, particularly when the laminates are assembled in normal back-to-back method during consolidation in accordance with normal procedure. In fact, it is usual that a considerable portion of the thickness variation of the woven ply is produced in the back or bottom surface and this reduces the maximum depth of the embossment at the decorative surface, and requires that more than the normal amount of material must be sanded from the back of the laminate. While this tendency can be avoided to some extent by pressing the laminate against a lower caul plate instead of against the back of another laminate, this solution to the problem is accomplished only at the penalty of further reducing consolidation of the depressed portions of the design, i.e. increasing the second and most important defect discussed above, as well as an increased cost in production.

SUMMARY OF THE INVENTION

It is, accordingly, an object of the persent invention to overcome and/or diminish the defects of the prior art, such as those indicated above.

It is another object of the persent invention to produce decorative high pressure laminates having deeply embossed surfaces, in a simplified and inexpensive manner.

It is another object of the present invention to provide a new and improved method for inexpensively manufacturing high pressure laminates having embossed surfaces.

It is another object of the present invention to provide a high pressure laminate with deeply embossed surfaces that can substantially exceed a 7 mil depth variation.

It is another object of the present invention to provide deep embossments in a high pressure laminate through use of an embedded ply containing the desired depth variations, in which the depressed portions of the laminate surface are subjected to enough pressure to become completely consolidated, without significantly crushing or distorting the embedded ply.

In the present exemplification of this invention, there is disclosed a method in which a decorative sheet of thickness variation greater than 7 mils and preferably having openings passing therethrough, such as woven cane, lace, etc., is interposed in the assembly prior to lamination between the print sheet and the overlay and, on top of the parting sheet there is placed a thermoplastic layer having a melting or softening temperature such that the thermoplastic is in fluid state during the laminating procedure, and wherein the quantity in volume of the thermoplastic layer is not greatly less than the "volume variation" of the decorative sheet. By "volume variation" what is meant is the difference between (1) the maximum thickness of the decorative sheet multiplied by its plane area, and (2) the actual volume of the decorative sheet.

To the attainment of these ends and the accomplishment of the above as well as other new and useful objects as will appear below, the invention relates to the features of novelty in substantially the construction, combination, and arrangement of the several parts hereinafter more fully described and shown in the accompanying drawings as an example illustrating this invention, is being understood that the illustrated embodiment is intended as merely exemplary and in no way limitative.

BRIEF DESCRIPTION OF THE DRAWINGS

FIGS. 1, 2A, 2B and 2C correspond to features of the prior art given as background material and described above;

FIG. 3B schematically shows, in cross section, a consolidated laminate in accordance with the present invention; and FIG. 3C schematically shows the effect of the thermoplastic layer during the laminating operation.

DESCRIPTION OF THE PREFERRED EMBODIMENT

It was discovered, in accordance with the present invention, that if a laminate, in which a ply of varying cross section was incorporated, was consolidated under heat and pressure using a thermoplastic layer between the upper laminate surface and the upper caul plate, then the cured laminate surface had greatly increased depth variation and the depressed or debossed portions were fully consolidated and the back or bottom of the laminate was virtually smooth as shown in FIG. 3B.

Figure 3A:
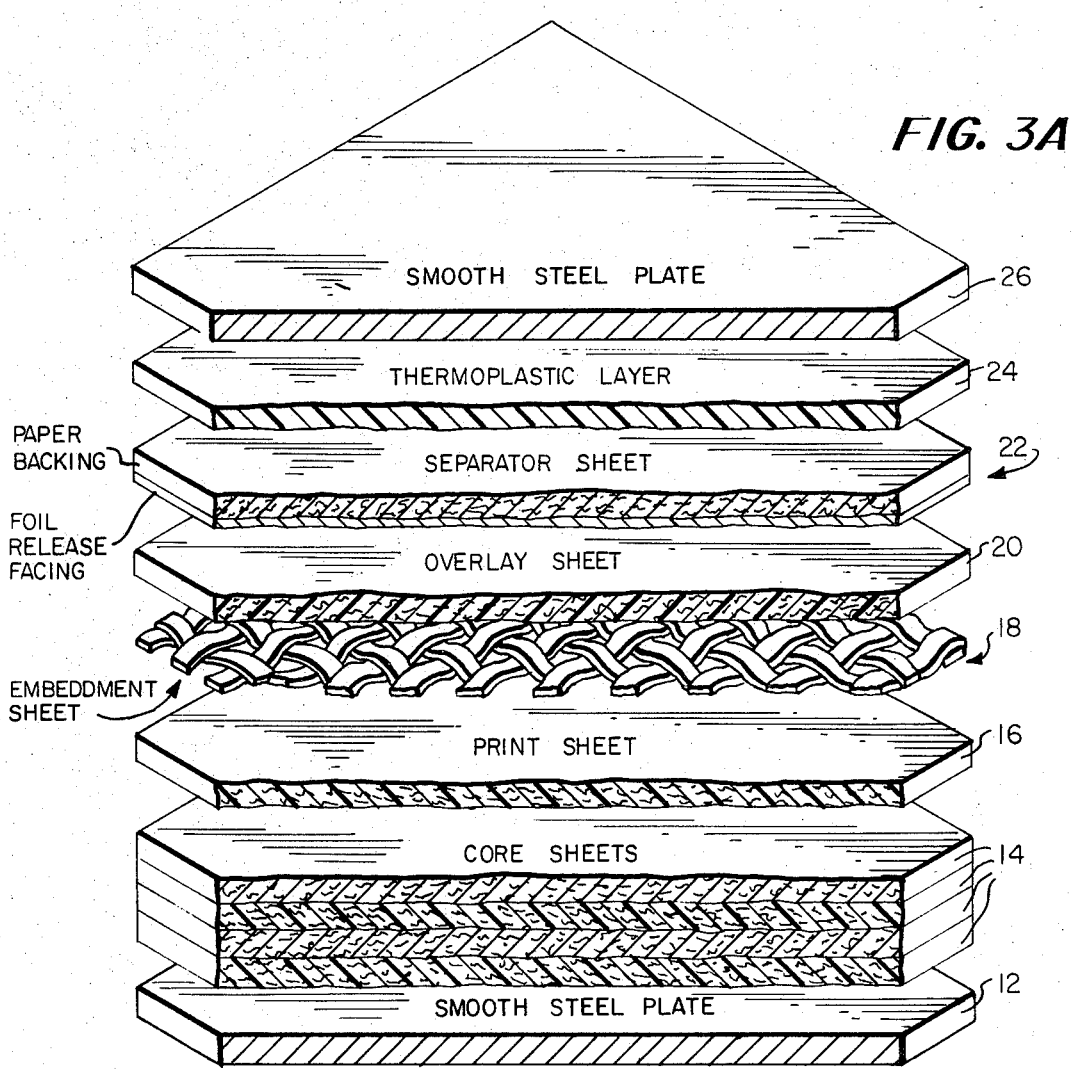
FIG. 3A schematically shows the formation of a laminate in accordance with the present invention.
Figure 1:
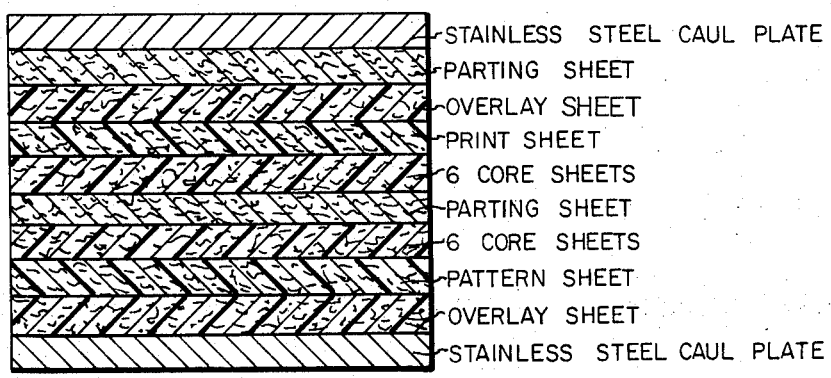

The thermoplstic layer is one which has considerable flow at temperatures below the flow point of the melamine resin; it appears that the thermoplastic layer above the parting sheet, as shown in FIG. 3A, acts substantially as a liquid under the conditions of temperature and pressure used to consolidate the laminates, with this condition, pressure is transmitted uniformly from the smooth plate to the irregular laminate cross section, i.e. without high pressure concentrations at the high point of the embedment and low pressure at the low points of the embedment. Evidence that the pressure is transmitted uniformly is given by the fact that the back of the cured laminate is flat and that the low points or depressions are clear and fully consolidated.

The results are surprising since, when using previous methods such as a parting sheet with or without paper cushion, the back of the laminate contains considerable amount of surface embossment as shown in FIG. 2B, and the low points are hazy. It was also surprising that a thermoplastic layer could be used and would be effective at the high temperature and pressures utilized during laminating, without having such thermoplastic extrude in its fluid state from the edges of the assembly.

In accordance with FIG. 3A, it is seen that the assembly provided to produce a laminate in accordance with the present invention comprises, from the bottom upwardly, a conventional flat molding die or steel caul plate 12, a plurality of conventional phenolic impregnated core sheets 14, a conventional melamine impregnated print sheet 16 to provide a decorative background, a suitable embedment sheet 18 which is preferably a decorative sheet of thickness variation greater than 7 mils and having openings passing therethrough, a conventional melamine resin impregnated overlay sheet 20, a conventional parting or separator sheet 22, the thermoplastic layer 24, and the upper steel caul plate 26, which is also preferably smooth.

It will be understood that the laminating dies or caul plates 12 and 26 are of conventional construction and, while preferably of iron or steel, may be of any suitable dimensionally stable material. The overlay sheet 20 and the print sheet 16 are also of conventional construction, preferably of alpha-cellulose paper impregnated with poly-melamine-formaldehyde resin; the print sheet 16 is preferably impregnated with dye of suitable color, or it may be overprinted with a suitable color and/or design. The core sheets are also of conventional construction, preferably kraft paper impregnated with phenol-formaldehyde resin.

The separator sheet, release layer or parting membrane 22 is also of conventional construction. These parting sheets, normally used but once then thrown away, may be selected from those commercially available including kraft paper bonded to aluminum foil having a thickness of about 0.3 mil, various papers coated and/or impregnated with various resins and plastics such as fluorocarbon resins, silicone oils or resins, sodium alginate coated papers, and "Quilon" treated paper, etc.

With respect to the woven embedment 18, this may be of almost any construction although it is preferably a porous sheet of decorative construction having thickness variations greater than 7 mils; while not essential, it is preferred that at least some of the thickness variation extend entirely therethrough in order to permit the print sheet 16 to provide a decorative background and to improve bonding to such print sheet. In particular open weave woven fabrics are quite desirable, such as woven cane, burlap, etc. Other plies can also be used such as lace, or a paper sheet containing holes of various shapes. The material from which the embedment 18 is formed is non-critical, although it should be a porous material such as cloth or paper, so that it can absorb some of the resin from the print sheet and overlay sheet during the laminating procedure, to effect a good bond. Of course, the woven embedment 17 must not be made of a material so fragile that it would be destroyed during lamination, such as by melting.

The nature of the thermoplastic layer 24 is such that it must have considerable flow at temperatures below the flow point of the melamine resin. Accordingly, the thermoplastic material may be selected on the basis of the ultimate laminating temperature and pressure to be used. One type of layer which has been found to be highly successful is an extruded polyethylene film of 6–12 mils thickness; other thermoplastic layers may, however, be used in place of the polyethylene and these will be easily selected from known materials.

The following specific examples are offered as further illustrations of the invention:

EXAMPLE 1

A pressing was made using as an embedment, a woven paper web in which each strand had been folded to a thickness of about 40 mils. The amount of open spaces in the weave was equal to about 30% of the surface. The thermoplastic film used behind the parting sheet was two layers of polyethylene film each 6 mils thick. After pressing, the parting sheet and the polyethylene film were stripped from the laminate in one piece and examined. A highly satisfactory laminate resulted, having a depth of embossment in its surface of approximately 35 mils. The polyethylene film was almost completely molded into a grid shape as shown in FIG. 3C, the grid shape being a negative of the cross section of the embedment. In this case, the volume of openings in the web used up practically all the polyethylene, resulting in a uniform distribution of the 1000 p.s.i. pressure applied to the laminate.

As a comparative test, the same laminate construction was pressed using four sheets of 128 lb. kraft paper in place of the polyethylene film. In this case the depth variation in the cured laminate surface was only about 10 mils and the web strands were badly flattened.

EXAMPLE 2

The process of Example 1 was repeated using as the embedment 18, a woven cane material having a thickness of about 20 mils. Once again, two sheets of 6 mil polyethylene film were used above the parting sheet 22. The lamination carried out at 1000 p.s.i. and 260–310° F. produced a highly satisfactory laminate just as in Example 1. The polyethylene film was molded into a negative of the cross section of the embedment and the depth variation in the cured laminate was approximately 20 mils. The depressions or debossed portions of the laminate were fully transparent and well consolidated and the back of the laminate was flat and smooth as in Example 1.

It will be obvious to those skilled in the art that various changes may be made without departing from the scope of the invention and the invention is not to be considered limited to what is shown in the drawings and described in the specification.

What is claimed is:

1. In a decorative high-pressure laminate having a decorative surface and a bottom surface, comprising: a bottom backing of cured phenolic impregnated paper core sheets; the improvement comprising:
    an uncrushed decorative sheet of thickness variation greater than 7 mils, said decorative sheet being located above said backing;
    wherein the top surface of said high-pressure laminate is embossed and debossed to provide a surface variation in thickness greater than 7 mils and in which the debossed portions are fully consolidated, and the bottom surface of said laminate is relatively flat.

2. In a decorative high-pressure laminate in accordance with claim 1 further comprising a top facing overlay of cured melamine resin impregnated α-cellulose paper and a cured amino resin impregnated print sheet between said facing and backing, wherein said decorative sheet is interposed between said overlay and said print sheet.

3. A laminate in accordance with claim 2 wherein said decorative sheet has openings passing entirely therethrough.

4. A laminate in accordance with claim 2 wherein said amino resin is melamine resin, and said decorative sheet is selected from the group consisting of woven materials and lace.

5. A method for producing a decorative, high pressure laminate having a bottom backing of cured phenolic impregnated paper core sheets and an uncrushed decorative surface sheet of thickness variation greater than seven mils located above said backing, the top surface of said high pressure laminate being embossed and debossed to provide a surface variation in thickness greater than seven mils and in which the debossed portions are fully consolidated, and the bottom surface of said laminate being relatively flat, said method comprising:
    (A) assembling in a stack, from the bottom upwardly:
        (1) a relatively flat backing die,
        (2) a plurality of phenolic resin impregnated core sheets, (3) a decorative sheet of thickness variation greater than seven mils,
(4) a parting sheet,
(5) a thermoplastic layer of melting or softening temperature such that said thermoplastic is in substantially fluid state during lamination, said thermoplastic layer being at least about six mils thick and whose volume is not greatly less than the volume variation in said decorative sheet, and
(6) a fronting die;

(B) squeezing said assembly under about 500–1200 p.s.i. at a temperature of about 260–310° F. for a time sufficient to effect lamination and cure said resin impregnated sheets to a unitary structure; and (C) stripping said dies, said parting sheet and said thermoplastic layer from the resultant laminate.

6. A method in accordance with claim 5 wherein said decorative sheet has openings passing entirely therethrough.

7. A method in accordance with claim 5 wherein said thermoplastic layer comprises polyethylene film of 6–12 mils thickness.

8. A method in accordance with claim 5 wherein said assembled stack further comprises an amino-resin impregnated print sheet located between said plurality of phenolic-resin impregnated core sheets and said decorative sheet of thickness variation greater than seven mils, and a melamine-resin impregnated α-cellulose overlay sheet between said decorative sheet of thickness variation greater than seven mils and said parting sheet.

References Cited
UNITED STATES PATENTS

| | | | |
|---|---|---|---|
| 3,373,068 | 3/1968 | Grosheim et al. | 156—289 X |
| 3,311,520 | 3/1967 | Michaelson et al. | 156—289 X |
| 3,413,188 | 11/1968 | Allen | 156—289 X |
| 3,418,189 | 12/1968 | Grosheim | 161—264 X |

WILLIAM A. POWELL, Primary Examiner

U.S. Cl. X.R.

156—219, 289, 323; 161—116, 119, 263, 413

UNITED STATES PATENT OFFICE
CERTIFICATE OF CORRECTION

Patent No. 3,700,537    Dated October 24, 1972

Inventor(s) HERBERT I. SCHER

It is certified that error appears in the above-identified patent and that said Letters Patent are hereby corrected as shown below:

Line 5, insert:

Assignee: Esso Research and Engineering Company
Linden, New Jersey

Signed and sealed this 17th day of April 1973.

(SEAL)
Attest:

EDWARD M. FLETCHER, JR.
Attesting Officer

ROBERT GOTTSCHALK
Commissioner of Patents